(12) United States Patent
Hugger

(10) Patent No.: US 7,040,542 B2
(45) Date of Patent: May 9, 2006

(54) METHOD AND APPLIANCE FOR REGULATING THE INFLOW OF HOT WATER TO A CONTAINER

(75) Inventor: Werner Hugger, Gränichen (CH)

(73) Assignee: KWC AG, Unterkulm (CH)

( * ) Notice: Subject to any disclaimer, the term of this patent is extended or adjusted under 35 U.S.C. 154(b) by 203 days.

(21) Appl. No.: 10/847,590

(22) Filed: May 18, 2004

(65) Prior Publication Data
US 2004/0231725 A1    Nov. 25, 2004

(30) Foreign Application Priority Data
May 22, 2003    (CH) ..................................... 0919/03

(51) Int. Cl.
*G05D 23/13*    (2006.01)

(52) U.S. Cl. ........................ 236/12.12; 4/676

(58) Field of Classification Search ............. 236/12.12; 4/676, 677
See application file for complete search history.

(56) References Cited

U.S. PATENT DOCUMENTS

| | | | |
|---|---|---|---|
| 4,693,415 A | | 9/1987 | Sturm |
| 4,696,428 A | * | 9/1987 | Shakalis .................. 236/12.12 |
| 4,909,435 A | * | 3/1990 | Kidouchi et al. ......... 236/12.12 |
| 4,941,608 A | * | 7/1990 | Shimizu et al. .......... 236/12.12 |
| 5,058,804 A | * | 10/1991 | Yonekubo et al. ....... 236/12.12 |
| 5,170,361 A | * | 12/1992 | Reed .......................... 700/283 |
| 5,651,384 A | | 7/1997 | Rudrich |
| 6,473,917 B1 | | 11/2002 | Mateina |
| 6,705,534 B1 | * | 3/2004 | Mueller ................... 236/12.12 |
| 2002/0148040 A1 | | 10/2002 | Mateina |
| 2003/0080194 A1 | * | 5/2003 | O'Hara et al. ........... 236/12.12 |

FOREIGN PATENT DOCUMENTS

| | | |
|---|---|---|
| DE | 35 46 550 A1 | 7/1987 |
| DE | 39 25 590 A1 | 2/1991 |
| DE | 296 20 414 U1 | 2/1997 |
| DE | U 201 21 547 | 1/2003 |
| EP | 1 249 544 A1 | 10/2002 |

* cited by examiner

*Primary Examiner*—William E. Tapolcai
(74) *Attorney, Agent, or Firm*—Oliff & Berridge, PLC

(57) ABSTRACT

A temperature measuring device and a flowrate measuring device are both connected to a regulating unit, thus enabling the mixing temperature of the mixing water flowing through a supply line and the flowrate to be determined. The regulating unit serves for controlling a mixing valve and a shut-off valve. At the end of the filling operation, the overall volume introduced into a container and input via a control apparatus has the likewise input desired temperature, the regulating unit continuously determines, based on the flowrate and the measured mixing temperature, since a starting time point, the actual heat quantity contained in a part volume which has already flowed out. By virtue of this determination, and based on the target heat quantity to be stored in the respectively predetermined overall volume in the case of the predetermined desired temperature, if appropriate, the regulating unit causes the mixing temperature to be increased or reduced by changing the mixing ratio between the hot water supplied to the mixing valve via a first supply line and the cold water supplied via a second supply line.

12 Claims, 2 Drawing Sheets

METHOD AND APPLIANCE FOR REGULATING THE INFLOW OF HOT WATER TO A CONTAINER

CLAIM FOR PRIORITY

The present application relates to subject-matter contained in and claims priority to Swiss Patent Application 2003 0919/03 filed May 22, 2003.

BACKGROUND OF THE INVENTION

1. Field of Invention

The invention relates to a method and an appliance for regulating the inflow of hot water to a container.

2. Description of Related Art

Demands for defined volumes of liquids of specific temperature is an objective in various applications. These areas include private households, for example, in bathrooms and kitchens, the service trades, such as catering, industry, in particular the chemical and food industry, in agriculture and in the public sector, including the health service. In general, for this purpose, part volumes with a forward flow having a lower temperature than the desired (or target) temperature (referred to as mixing temperature below) and part volumes with a forward flow having a higher temperature than the desired temperature (mixing temperature) are mixed with one another. In most cases, the liquids are water or aqueous solutions, and therefore this case is described below. However, all the designs may be extended to virtually any liquids.

Mixing appliances, also referred to in the sanitary sector as mixing taps or mixing batteries, which at the outflow control a defined mixing temperature with the aid of a control which has actuators for setting the throughflow volumes (flowrate) of a hot and cold water supply line as a function of the instantaneous mixing temperature determined by means of a temperature measuring device, are described, for example, in DE-A-3,546,550 and the corresponding U.S. Pat. No. 4,693,415.

An appliance and a method of the type initially mentioned, which, in addition to a control of the mixing temperature, also provide a specific overall volume, and are known, for example, from EP-A-1,249,544 and the corresponding U.S. Pat. No. 6,473,917 B2. In this case, the part volume which has flowed out is measured by means of a flowrate measuring device installed in the mixing water line upstream of the outflow or via a device for detecting the filling level in a collecting container and is compared with the predetermined overall volume.

The method and appliances described are in this case based on the assumption that, when the mixing temperature of the outflowing liquid is being regulated, the overall volume which has flowed out (also referred to as the desired volume) also possesses this mixing temperature. In practice, however, the desired temperature of the overall volume deviates from the mixing temperature of the outflow. This is due, for example, to heated or cooled liquids in the inflow lines, sudden pressure changes and, consequently, also flowrate changes in the inflow lines, and transient phenomena in the control and regulating circuits. Deviations of the mixing temperature from the desired temperature which are caused thereby lead in total to the deviation observed in practice.

SUMMARY OF THE INVENTION

Various exemplary embodiments of the present invention provide a method and appliance, in the case of a predetermined overall volume, to achieve a predetermined target temperature. A cost-effective production of the appliance should be ensured at the same time.

Various exemplary embodiments of the present invention offers an integral regulating principle for achieving a predetermined target temperature of a specific overall volume which has flowed out. For this purpose, a line system for liquids includes a mixing device disposed between two inflows and one outflow, and a flowrate. The line system also includes a temperature measuring device downstream. The mixing device is controlled with electrically, pneumatically or hydraulically controllable actuating members. Control signals of the actuating members are delivered by a regulating unit connected to the actuating members.

In the method according to various exemplary embodiments of the invention, after an initialization procedure, the signals delivered by the temperature and flowrate measuring device are further processed by a regulating unit and both the part volume which has flowed out and the actual heat quantity associated with it are calculated. The heat quantity transported in a specific time interval is in this case proportional to the part volume of a liquid which has flowed through during the time interval, to the duration of the time interval and to the temperature difference between the mixing temperature and a reference temperature. The heat quantity transported, since the starting time point of the outflow, together with the volume which has flowed out is continuously integrated in the regulating unit.

Thus, the integral values, that is to say the part volume which has flowed out and the actual heat quantity transported together with this, including possible deviations of the mixing temperature from the desired or target temperature, at the respective measurement time point are known. The regulating unit calculates from these data the remaining difference between the desired or target heat quantity of the overall volume and the actual heat quantity of the part volume which has flowed out. Taking into account the difference between the overall volume and the part volume which has already flowed out, a new mixing temperature to be adjusted and the corresponding manipulated variable values for setting the mixing ratio of the cold and hot water inflow for the mixing valve are determined.

By various exemplary embodiments, regulation takes place until the predetermined overall volume has flowed out. In the event of a fault, regulation is interrupted when limit values monitored by the system itself are overshot, for example a maximum value of the mixing temperature, or by the action of a user. Should the desired heat quantity not be achieved, for example due to too low a forward flow temperature of the hot water, or the overall volume not being achieved or should other malfunctions occur during normal regulating operation, then corresponding warnings are issued to the user.

The method according to various exemplary embodiments of the invention and the corresponding appliance are distinguished by high accuracy and robustness despite the use of cost-effective and simple components, since deviations of the mixing temperature from the desired temperature are detected via the continuous integration of the heat quantity transported together with the part volume which has flowed out and are incorporated into the regulation of the mixing water temperature. The overall volume does not have to be determined by means of an additional filling level measuring device, and a possible heat radiation during the outflow operation can, after calibration, be subtracted in a simple way during the integration procedure and thus be incorporated in the regulation.

BRIEF DESCRIPTION OF THE DRAWINGS

An embodiment of the invention is explained in more detail below with reference to the drawings in which.

DETAILED DESCRIPTION OF EXEMPLARY EMBODIMENTS

Figure 1:
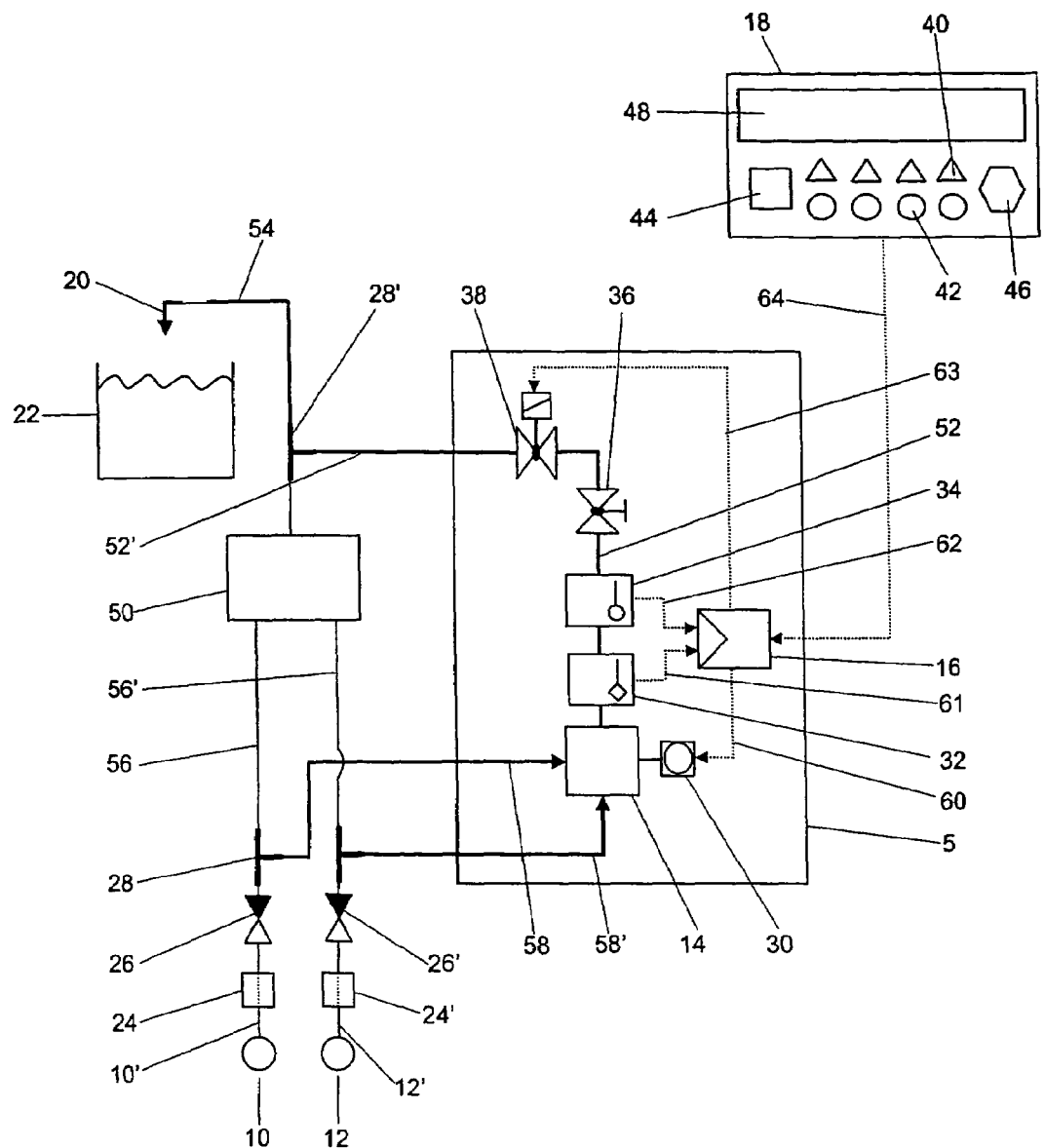
FIG. 1 shows diagrammatically the basic set-up of an automated mixing tap assembly, including remote control, and of a hand-operated mixing tap assembly routed in parallel with this.

In the embodiment illustrated in FIG. 1, an automated mixing tap assembly 5 is integrated, parallel to a hand-operated mixing tap assembly 50 of a known type, into a line system for hot and cold water. The mixing tap assemblies 5, 50 are connected between an inflow 10 for cold water and an inflow 12 for hot water and also an outflow 20. Inflow lines 10', 12' for cold and hot water, respectively, are connected to the inflows 10, 12 which, for example, provide water with a forward flow temperature of 15° C. and 65° C., respectively.

A filter element 24, 24' is inserted in each case into each inflow line 10', 12', in order to retain the impurities entrained in the inflow lines 10', 12'. A possible backflow of water out of the line system running upstream is prevented by means of nonreturn members 26, 26', in each case one in the cold water inflow line 10' and one in the hot water inflow line 12'. By means of two T-pieces 28, the water flow is subsequently conducted in each case to two cold water lines 56, 58 and two hot water lines 56', 58'.

The pairs in each case consisting of a cold water line 56, 58 and a hot water line 56', 58' are followed downstream, on the one hand, by the mixing tap assembly 50 of a known type for manual actuation and, on the other hand, by the mixing tap assembly 5 for automated mixing. In the embodiment described, the mixing tap assemblies 50, 5 operate independently of one another. The mixing tap assembly 50 makes it possible to set the outflow of mixing water by hand according to temperature and to quantity. However, the manually actuated mixing tap assembly 50 is not required for the satisfactory functioning of the automated mixing tap assembly 5 and, if appropriate, may be dispensed with.

Downstream of the mixing tap assembly 5, 50 is provided an outflow line 54 which leads to the outflow 20.

The cold and hot water lines 58, 58' leading to the automated mixing tap assembly 5 issue into a mixing valve 14 of a known design, serving as an actuating member and having a mixing chamber. The mixing valve 14 is equipped with an electric servomotor 30 which, as a function of an actuating travel, controls the flowrate ratio of the hot and cold water flowing into the mixing chamber. The mixing valve 14 may, if appropriate, be replaced by an arrangement consisting of two actuating valves, one each for the cold and the hot water lines 58, 58', and of a mixing chamber.

The signals for activating the servomotor 30 are delivered by a regulating unit 16 via a signal line 60. The regulating unit 16 is equipped with an input and output unit, a microprocessor and a storage unit. The regulating function for processing the input signals and for determining the output signals is filed in the regulating unit 16 in the form of a program code. The regulating unit 16 and signal lines 60, 61, 62, 63, 64 may be designed both partially and completely as pneumatic or hydraulic, but preferably electrical regulating circuit elements. In the embodiment described, there is an electrical regulating circuit with digital signal processing and signal transmission.

The input of parameters and control signals to the regulating unit 16 takes place via a remote control apparatus 18. The regulating unit 16 and the remote control apparatus 18 are connected to one another via the signal line 64. Signal transmission may also take place via a pneumatic or hydraulic line, by infrared or radio transmission or in another way. The remote control apparatus 18 may be arranged at a point remote from the mixing tap assembly 5 or be connected fixedly to the mixing tap assembly 5. The remote control apparatus 18 has keys or switches 40 for preselecting an overall volume of, for example, 2, 5, 10 and 20 liters, keys or switches 42 for preselecting the target temperature of the water in the overall volume to be provided, for example of 20° C., 30° C., 40° C. and 50° C., a start key 44 for starting the automated mixing method and a stop key 46 for stopping the mixing method.

Furthermore, the remote control apparatus 18 has an indicator 48 for displaying the preselected parameters, the current mixing temperature and the part volume which has already flowed out. Further information on the system state may likewise be displayed. Additional signals and parameters, for example the flowrate or individual values for the overall volume and the target temperature, may be input by means of an extended keyboard and be transferred to the regulating unit 16.

The control signals conducted from the regulating unit 16 to the servomotor 30 of a mixing valve 14 via the signal line 60 bring about the setting of a specific mixing ratio of hot and cold water in the mixing chamber of the mixing valve 14.

The mixing water, after emerging from the mixing chamber of the mixing valve 14, passes through a flowrate measuring device 32. The flowrate measuring device 32 delivers electrical signals to the regulating unit 16 as a function of the mixing water flowrate via the signal line 61.

The mixing temperature of the water is determined by means of a temperature measuring device 34 arranged downstream of the flowrate measuring device 32 in a mixing water line 52. Electrical signals generated by the temperature measuring device 34 are conducted to the regulating unit 16 via the electrical signal line 62.

The arrangement of the flowrate measuring device 32 and of the temperature measuring device 34 in the mixing water line 52 may, if appropriate, be interchanged.

The temperature measuring device 34 is followed downstream by a shut-off valve 36 which is to be operated by hand. It serves for safety and maintenance purposes and allows an additional shut-off, but is not necessary for a normal mixing operation.

A further shut-off valve 38 which follows downstream is designed as a solenoid valve. The actuating drive of the shut-off valve 38 is connected to the regulating unit 16 by means of the signal line 63. As a result of a corresponding signal from the regulating unit 16, in the event that the part volume which has run out corresponds to the predetermined overall volume or the user triggers a signal for stopping the mixing operation, the mixing water flow is interrupted. The shut-off valve 38 may also be designed as an actuating valve, as a result of which, in the case of corresponding adaptations of the regulating unit 16, it becomes possible to control the mixing water flowrate between no flowrate and a maximum flowrate.

The mixing water provided flows, downstream of the shut-off valve 38, through a mixing water line piece 52' which is connected to the outflow line 54 via a T-piece 28'. The water flowing out of the outflow 20 is collected in a container 22.

The method is described below by the example of a typical filling operation illustrated in FIG. 2.

Figure 2:
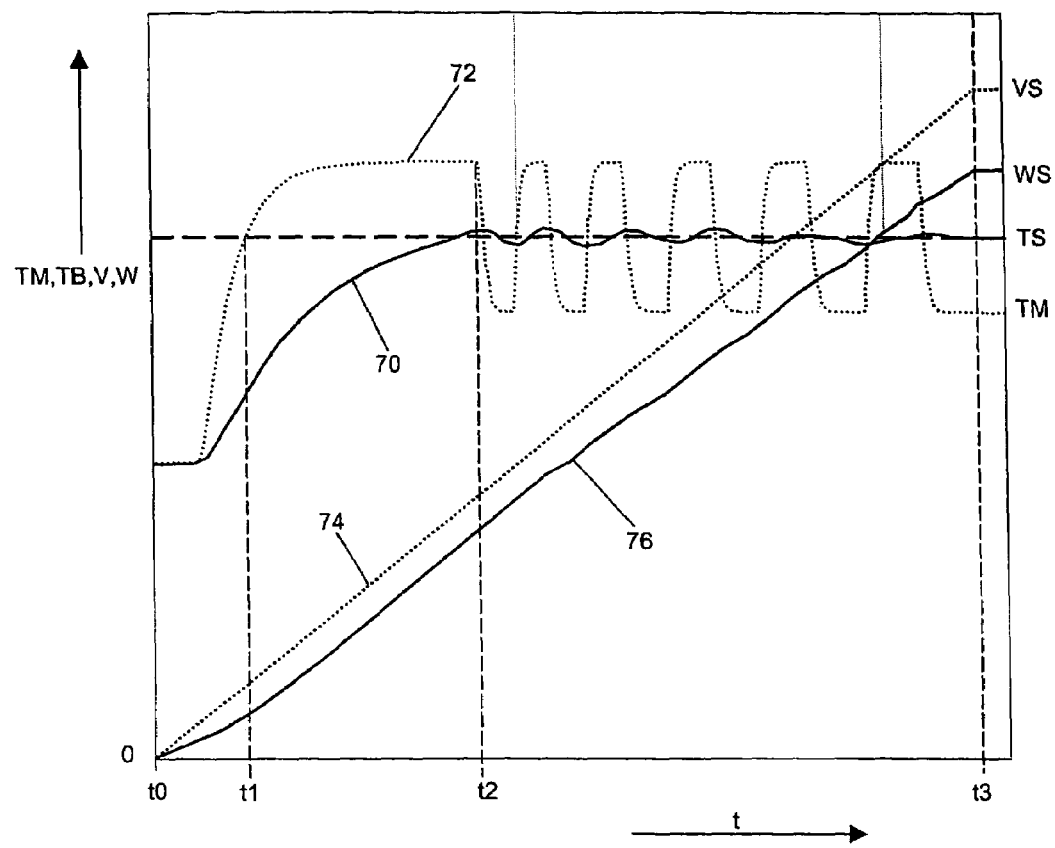
FIG. 2 shows a graph with a basic illustration of the regulating behavior of the automated mixing tap assembly shown in FIG. 1.

For this purpose, the graph of FIG. 2 shows a qualitative profile of the mixing water temperature TM (curve 72), the profile of the temperature TB of the water located in the container 22, with a part volume V (curve 70), the profile of the part volume V itself (curve 74) and the profile of a heat quantity W deposited together with the part volume V in the container 22 such as actual heat quantity (curve 76) as a function of the time t.

The starting time point defined by the actuation of a key 44 on a remote control apparatus 18 is designated by t0. At the starting time point t0 of the filling operation, first a target heat quantity WS is calculated from the predetermined overall volume (filling quantity) VS and from the target temperature TS. Subsequently, the shut-off valve 38 is opened, and mixing water flows out of the outflow 20 into the container 22. The part volume V correspondingly rises, as shown in the curve 74.

The part volume V and the heat quantity W transported together with the water which has flowed out are determined by integration from the continuously detected data of the mixing water flowrate and of the mixing temperature TM.

The regulating unit 16 then continuously compares the part volume V with the overall volume VS and the heat quantity W contained therein with the target heat quantity WS. A new mixing temperature to be adjusted and the corresponding manipulated variable value for the mixing valve 14 are determined from the differences between the compared data, that is to say a remaining volume and a remaining heat quantity.

In this case, the actual heat quantity W transported together with the part volume V is always used as a basis for determining the mixing temperature to be adjusted. In this way, previous deviations due to cooled or heated water forward flows, to transient phenomena in the regulation, to sudden pressure and flowrate fluctuations and to further disturbing influences are detected and are compensated by means of the regulating circuit.

During the filling operation illustrated in FIG. 2, first, as a result of an appropriate activation of the servomotor 30, in the time segment t0–t1, the mixing temperature TM and the temperature TB in the part volume V which has flowed out rise with a short time delay and approach the target temperature TS up to the time point t1. In contrast to the known regulated methods, however, the mixing temperature TM is not regulated in relation to the target temperature TS, but in relation to the target heat quantity WS, the result of this being that, in the phase t1–t2, the mixing temperature TM rises beyond the target temperature TS. A heat quantity deficit from the time segment t0–t1 is thereby compensated. The heat quantity compensation is concluded at the time point t2, and, from then on, the mixing temperature TM moves approximately around the target temperature TS (curve 72).

The temperature TB in the container 22 essentially follows the mixing temperature TM (curve 70) with a time delay. Temperature maxima and minima are in this case damped to a greater extent with an increasing part volume V.

The part volume V has a virtually linear profile during the entire filling operation. This behavior is attributable to an approximately constant mixing water flowrate. The time point t3 of the stopping of the filling operation is determined in that the part volume V which has flowed out corresponds to the preselected overall volume VS.

The actual heat quantity W, in turn, approximately follows the profile of the part volume V, but is modulated appropriately as a result of the changes in the temperature TB in the container 22. At the stopping time point t3, the actual heat quantity W measured in the container 22 is identical to the calculated target heat quantity WS.

Thus, at the end of the filling operation, in a negligible discharge of heat from the water to the container 22 and to the surroundings, the mixing temperature TM also corresponds to the target temperature TS in the case of the preset filling quantity VS.

In the determination of the remaining heat quantity, by the incorporation of correcting data relating to the heat loss, for example based on calibration measurements of filling of various types of containers under specific ambient conditions, deviations between the target heat quantity to be introduced together with the water and the heat quantity actually deposited in the container can be minimized and the accuracy of the method can thereby be increased.

What is claimed is:

1. A method for controlling inflow of liquid to a container comprising:

setting a target mixture flowrate and a target temperature of a liquid mixture between first and second inflows of the liquid;

determining a mixing temperature and flowrate of the liquid mixture;

filling the container to a predetermined overall volume with the target temperature, obtaining a target heat quantity in the predetermined overall volume from the predetermined target temperature, and interrupting the inflow of the liquid when a predetermined overall flowrate quantity is achieved by a respective increase or reduction in the mixing temperature, wherein after filling the container, an actual heat quantity contained in the overall volume of the container corresponds at least approximately to the target heat quantity.

2. The method according to claim 1, wherein the actual heat quantity contained in a part volume which has already flowed out is determined continuously on the basis of the flowrate and of the measured mixing temperature since a starting time point, subsequently, as a result of this determination, and based on the target heat quantity to be stored in the respectively predetermined overall volume at the target temperature, the mixing temperature is increased or reduced by changing a mixing ratio between a first source liquid having a higher temperature than the target temperature, and a second source liquid having a lower temperature than the target temperature.

3. The method according to claim 2, wherein the actual heat quantity contained in a part volume which has already flowed out is determined by integration.

4. An appliance for carrying out the method according to claim 1, comprising:
- a line for a liquid;
- a temperature measuring device for measuring the mixing temperature connected to a regulating unit;
- a flowrate measuring device connected to the regulating unit
- a first shut-off valve arranged in the line is connected to the regulating unit wherein
- by respective increase or reduction in the mixing temperature after the conclusion of the filling operation, the actual heat quantity contained in the overall volume of the container corresponds at least approximately to the target heat quantity obtained from the predetermined overall volume and the temperature, and
- when a predetermined overall flowrate quantity is achieved, to interrupt the supply of liquid by the actuation of the first shut-off valve.

5. The appliance according to claim 4, wherein
- the line further includes a mixing valve connected to the regulating unit upstream of the temperature measuring device and the flowrate measuring device; and
- the temperature and flowrate measuring devices connect to a first supply line for a first liquid source having a higher temperature than the target temperature and
- a second supply line for a second liquid source having a lower temperature than the target temperature,
- the regulating unit to determine continuously the actual heat quantity contained in a part volume which has already flowed out of the container, based on the flowrate and of the measured mixing temperature, since a starting time point, and
- subsequently and based on the target heat volume to be stored in the predetermined overall volume in the case of the target temperature, to increase or reduce the mixing temperature by changing a mixing ratio between the first liquid source supplied via the first supply line and the second liquid source supplied via the second supply line.

6. The appliance according to claim 5, wherein the regulating unit determines by integration the actual heat quantity contained in a part volume which has already flowed out.

7. The appliance according to claim 5, wherein the mixing valve has a servomotor which can be activated by the regulating unit.

8. The appliance according to claim 4, wherein
- a remote control apparatus is connected to the regulating unit, and
- a keyboard enables the input of at least the overall volume or the overall flowrate quantity and the target temperature.

9. The appliance according to claim 5, wherein the line further includes a second manually actuatable shut-off valve which downstream of the mixing valve.

10. The appliance according to claim 5, wherein the mixing valve, the flowrate measuring device, the temperature measuring device and the first shut-off valve are combined to form a structural unit designed as an automatically operating mixing tap assembly.

11. The appliance according to claim 9, wherein the second shut-off valve is accommodated in the mixing tap assembly.

12. The appliance according to claim 10, wherein a second manually operable mixing tap assembly is connected in parallel to the automatically operating mixing tap assembly.

* * * * *